United States Patent
Hsu et al.

(10) Patent No.: US 9,239,261 B2
(45) Date of Patent: Jan. 19, 2016

(54) AMBIENT LIGHT SENSING DEVICE AND METHOD

(71) Applicants: En-Feng Hsu, Hsin-Chu (TW);
Meng-Huan Hsien, Hsin-Chu (TW)

(72) Inventors: En-Feng Hsu, Hsin-Chu (TW);
Meng-Huan Hsien, Hsin-Chu (TW)

(73) Assignee: PIXART IMAGING INCORPORATION, Hsin-Chu (TW)

( * ) Notice: Subject to any disclaimer, the term of this patent is extended or adjusted under 35 U.S.C. 154(b) by 207 days.

(21) Appl. No.: 13/863,250

(22) Filed: Apr. 15, 2013

(65) Prior Publication Data
US 2014/0061440 A1 Mar. 6, 2014

(30) Foreign Application Priority Data
Aug. 28, 2012 (TW) .............................. 101131086 A

(51) Int. Cl.
*G01J 1/44* (2006.01)
*G01J 1/18* (2006.01)
*G01J 1/42* (2006.01)

(52) U.S. Cl.
CPC ..... *G01J 1/44* (2013.01); *G01J 1/18* (2013.01); *G01J 1/4204* (2013.01); *G01J 1/4228* (2013.01)

(58) Field of Classification Search
CPC ............. G01J 1/44; G01J 1/18; G01J 1/4204; G01J 1/4228
USPC ...................... 250/214 AL; 341/139, 168–170
See application file for complete search history.

(56) References Cited

U.S. PATENT DOCUMENTS

| | | | |
|---|---|---|---|
| 5,801,773 A * | 9/1998 | Ikeda ......................... | 348/229.1 |
| 2011/0032391 A1* | 2/2011 | Cheung ........................ | 348/241 |
| 2012/0129269 A1* | 5/2012 | Choi et al. .................... | 436/164 |

* cited by examiner

*Primary Examiner* — Renee D Chavez
(74) *Attorney, Agent, or Firm* — Tung & Associates

(57) ABSTRACT

The invention provides an ambient light sensing device and an ambient light sensing method. The ambient light sensing device includes at least one pixel, a read out circuit, and a combination unit. The invention detects ambient light to obtain plural lower resolution exposure values corresponding to different dynamic ranges respectively, and combines the plural lower resolution exposure values to generate a higher resolution code combination, indicating the result of ambient light detection.

18 Claims, 5 Drawing Sheets

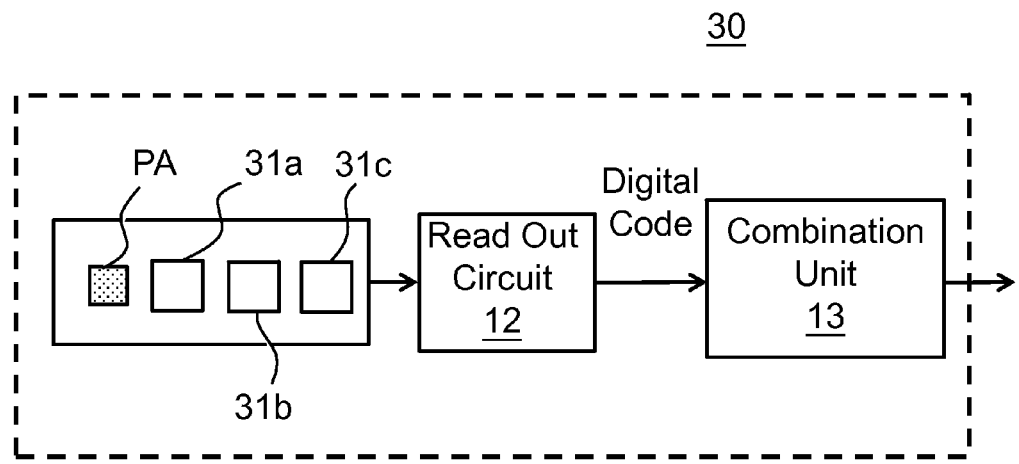
Fig. 7
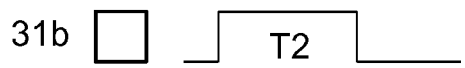
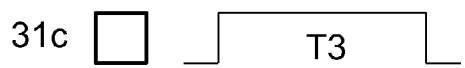
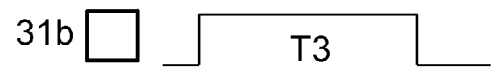
Fig. 8　　　　Fig. 9

AMBIENT LIGHT SENSING DEVICE AND METHOD

CROSS REFERENCE

The present invention claims priority to TW 101131086, filed on Aug. 28, 2012.

BACKGROUND OF THE INVENTION

1. Field of Invention

The present invention relates to an ambient light sensing device and method, especially an ambient light sensing device and method which combine plural lower resolution exposures to generate an code combination having an ambient light detection effect equivalent to or higher than one higher resolution exposure.

2. Description of Related Art

Ambient light sensing devices such as ambient light sensor are often used outdoors in street light, advertising digital signage, and indoors in 3C products. The ambient light sensing device therefore requires a resolution of a high dynamic range, capable of operating in low brightness environment (for example, 1 Lux brightness) and also capable of operating under strong sunlight (for example, 60,000 Lux brightness). The conventional method utilizes a 16-bit analog-to-digital converter to process sampled signals, because the requirement for high dynamic range resolution requires at least 16 bits. However, the 16-bit analog-to-digital converter occupies a large area and consumes high power; its technical complexity is also high. Therefore, it is desired and advantageous to provide an ambient light sensing device having a dynamic range equivalent to a 16-bit device without complicated circuitry.

SUMMARY OF THE INVENTION

In one aspect, the present invention provides an ambient light sensing device, which includes at least one pixel, a read out circuit, and a combination unit. The pixel receives plural exposures respectively having different exposure time durations for detecting different dynamic ranges. The read out circuit reads the exposures to generate corresponding digital codes. The combination unit combines the digital codes corresponding to the plural exposures to generate a code combination which indicates the sensing result of the ambient light. The code combination has a higher resolution than the digital codes.

In another preferable embodiment of the present invention, an ambient light sensing device is provided and the ambient light sensing device includes a plural pixels, a read out circuit, and a combination unit. Each of the plural pixels respectively receives at least one exposure, wherein the pixels have different active areas of different sizes, or receive exposures of different exposure time durations, or both of the above in combination, to sense different dynamic ranges. The read out circuit respectively reads the exposures to generate corresponding digital codes. The combination unit combines the digital codes corresponding to the exposures to generate a code combination which indicates the ambient light sensing result. The code combination has a higher resolution than the digital codes.

In a preferable embodiment of the present invention, the exposures include an exposure of a first dynamic range (Rx) and an exposure of a second dynamic range (Ry), wherein Rx is larger than Ry, and a part of the exposure in a difference range (Rx−Ry) in the first dynamic range has a higher resolution than the rest part of the exposure of the first dynamic range.

In a preferable embodiment of the present invention, the code combination includes a digital code corresponding to the part of the exposure in the difference range, or the digital code which is weighted. The combination unit combines it into the code combination to obtain a sensing effect of a relatively higher resolution.

In another preferable embodiment of the present invention, the exposures are performed by a sampling frame rate of 600 Hz or a multiple of 600 Hz, and each exposure is an average of sampled data of 30 sampling times or an average of sampled data of a multiple of 30 sampling times.

In a preferable embodiment of the present invention, the ambient light sensing device further includes a shaded pixel, wherein an exposure received by the at least one pixel generates an exposure output (EO) and an exposure received by the shaded pixel PA generates an exposure output (ED), and wherein the read out circuit generates the corresponding digital code according to a difference (EO−ED).

In a preferable embodiment of the present invention, the exposures include a plurality of first stage exposures and at least one second stage exposure, the first stage exposures determining the dynamic range that ambient light brightness presently falls in, and the pixel receiving the second stage exposure according to the determined dynamic range.

The present invention also provides an ambient light sensing method, including: obtaining a plurality of relatively lower resolution exposure values respectively corresponding to different dynamic ranges; and combining the plurality of lower resolution exposure values to generate a code combination having a relatively higher resolution to indicate the ambient light sensing result.

In an embodiment of the aforementioned method, the plurality of relatively lower resolution exposure values can be obtained by plural exposures, or obtained by exposing plural pixels respectively having different active areas of different sizes, or obtained by exposing different pixels with different time durations, or a combination of the above.

The objectives, technical details, features, and effects of the present invention will be better understood with regard to the detailed description of the embodiments below, with reference to the drawings.

BRIEF DESCRIPTION OF THE DRAWINGS

FIG. 7 shows another preferable embodiment of an ambient light sensing device according to the present invention.

FIGS. 8 and 9 show two preferable embodiments of the exposure sequences according to the present invention.

DESCRIPTION OF THE PREFERRED EMBODIMENTS

The drawings as referred to throughout the description of the present invention are for illustrative purpose only, but not drawn according to actual scale.

Figure 1:
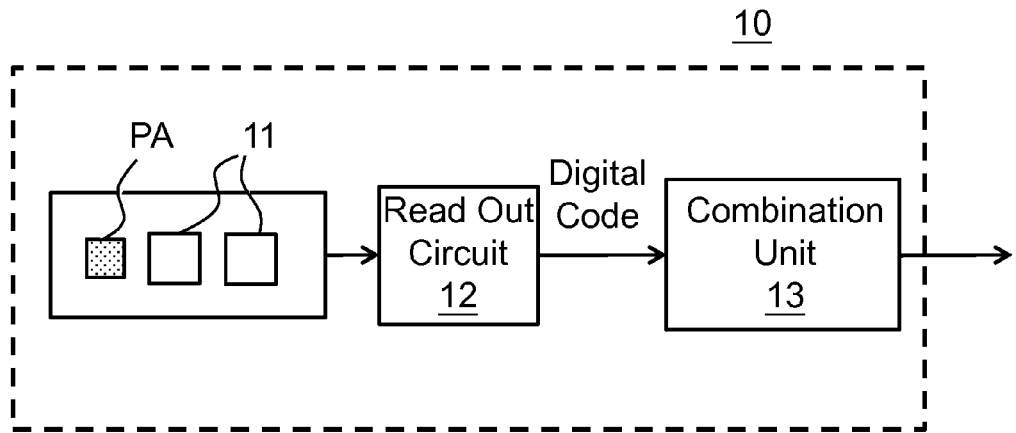
FIG. 1 shows a preferable embodiment of an ambient light sensing device according to the present invention.

FIG. 1 shows an embodiment of an ambient light sensing device 10 according to the present invention. The ambient light sensing device 10 includes at least one pixel 11 (two pixels 11 are shown but the number and size of the pixels 11 are not limited to what are shown in figure), a read out circuit 12, and a combination unit 13. In the first embodiment of the present invention, the pixels 11 are subject to multiple exposures to generate corresponding exposure values (wherein each exposure for example can include but not limited to plural samplings, and the exposure value for example can be but not limited to an average value of the plural samplings, to be explained later).

Figure 2:
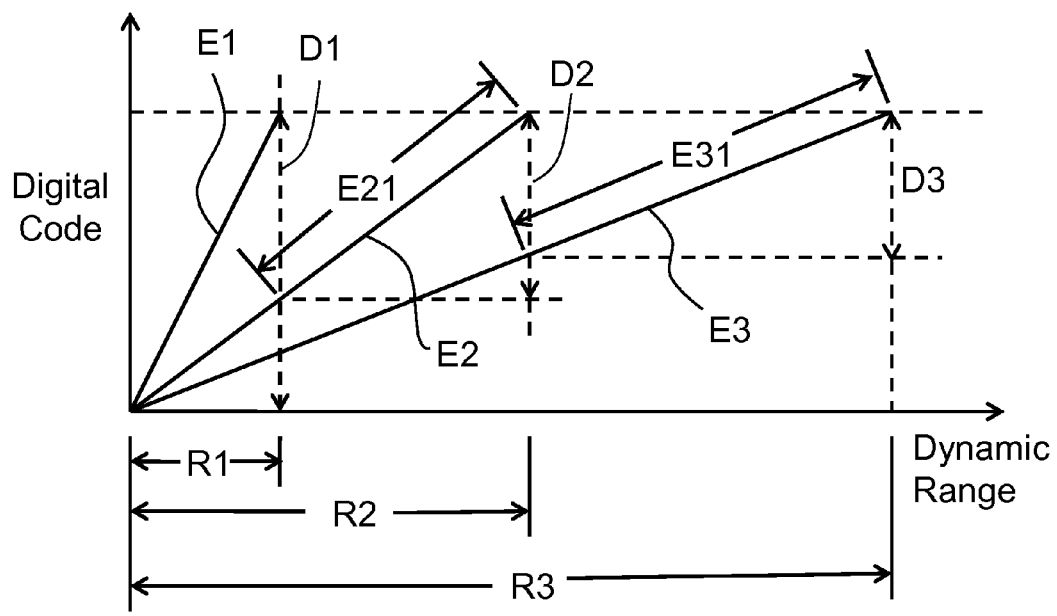
FIG. 2 shows the dynamic range and corresponding digital codes of the exposures.
Figure 3:
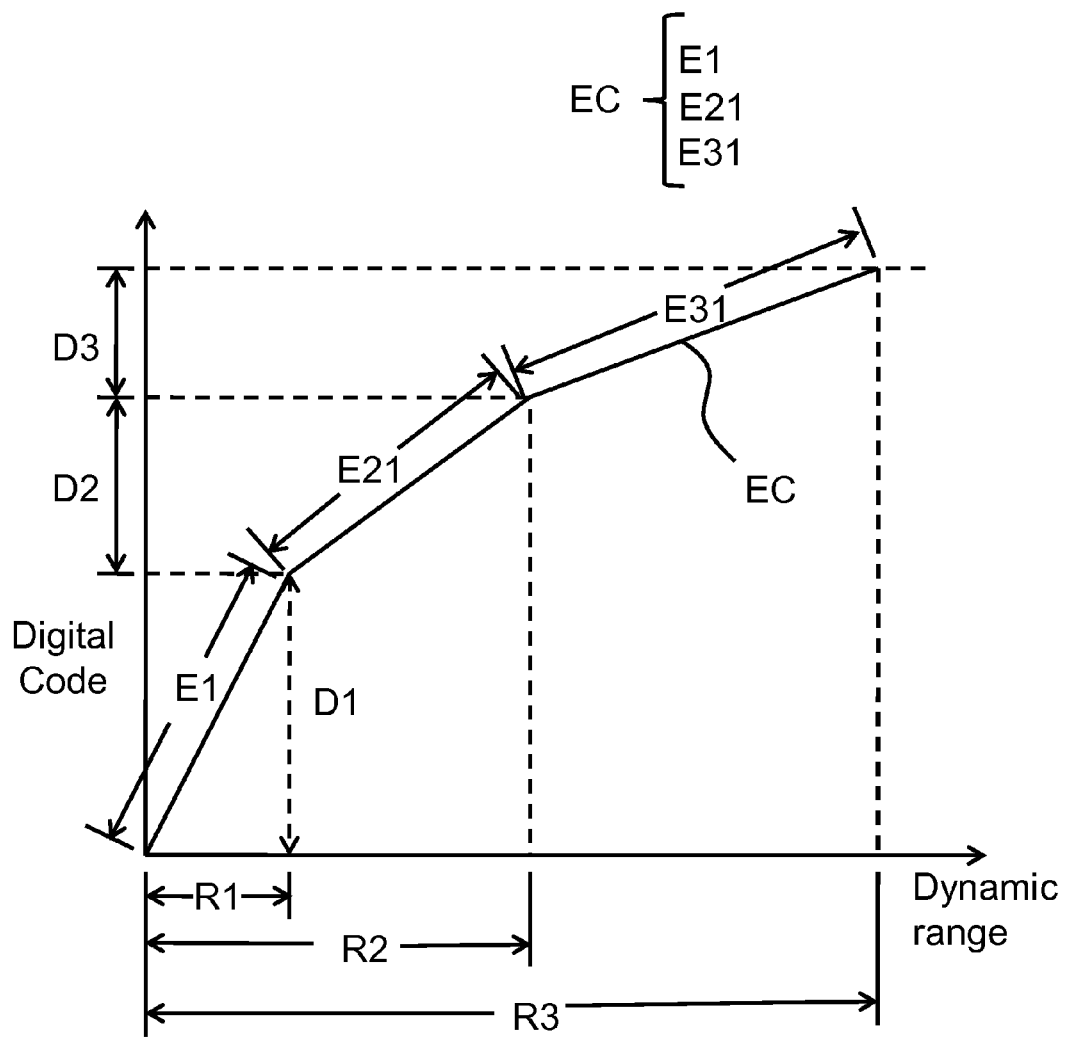
FIG. 3 shows a preferable embodiment of the relation between the exposure and the code combination according to the present invention.

Referring to FIG. 2, the horizontal axis represents the dynamic range, wherein a higher number indicates a higher brightness; the vertical axis represents digital codes corresponding to the dynamic range. For example, the digital codes are decimals 0~511 when a 9-bit analog-to-digital converter is used, and the digital codes are decimals 0~1023 when a 10-bit analog-to-digital converter is used. A lower bit number is used in the present invention, which is lower than the prior art; for example, when it is required for the prior art to use a 16-bit converter for obtaining the high dynamic range resolution, the present invention can obtain the same high dynamic range resolution by using a 9-bit or 10-bit converter. That is, the present invention does not need a 16-bit converter for same requirement. FIG. 2 illustrates an example wherein three exposures E1, E2, and E3 are taken, which is for illustrative purpose and the number of exposures is not limited to three. The exposures E1, E2, and E3 have different exposure time durations respectively, to sense different dynamic ranges R1, R2, and R3. The read out circuit 12 reads exposures E1, E2, and E3 to generate corresponding digital codes which indicate the exposure values. In this embodiment, the digital codes generated from E1, E2, and E3 have resolutions of the same digit number. However, the present invention is not limited to this, and the digital codes generated from E1, E2, and E3 can have different resolutions. The combination unit 13 combines the digital codes generated from the exposures E1, E2, E3 to generate a code combination (labeled EC and EC1 in FIGS. 3 and 4 respectively); the combination will be explained in detail is later. In short, the code combination represents the sensing result of the ambient light brightness in a full range. The code combination is obtained by combining exposures E1, E2, and E3, but not obtained from one single and direct analog-to-digital conversion, so the resolution of the code combination can be higher than one single analog-to-digital conversion, that is, the resolution can be equivalent to or even higher than the 16-bit prior art technique, but does not require using a 16-bit analog-to-digital converter.

FIG. 2 is an example of different exposure indifferent dynamic ranges. The exposures have different exposure time durations corresponding to different dynamic range R1, R2, and R3. The exposure time duration corresponding to a larger dynamic range (wider brightness range) such as R3 is relatively shorter, while the exposure time duration corresponding to a smaller dynamic range (narrower brightness range) such as R1 is relatively longer. In this way, the code combination of the exposures E1, E2, and E3 can represent the ambient light brightness in full range. To explain this from another point of view, a pixel is exposed three times by short, medium and long exposure time durations respectively. When the ambient light brightness is low, the long time exposure can provide the best sensing information and the short time exposure is less meaningful for this situation; when the ambient light brightness is high, the short time exposure can provide the best sensing information and the long time exposure is less meaningful. Therefore, after the exposures E1, E2, and E3 are converted to corresponding digital codes and these digital codes are suitably combined, a code combination is obtained which indicates the ambient light brightness in full range with high resolution.

The exposures E1, E2, E3 can be converted into corresponding digital codes by various ways. One straightforward way to do this is to divide the dynamic range evenly in correspondence to the brightness range (for example, in case of 9-bit resolution and a highest brightness of 65535 Lux, for the digital code generated from E3, 0 corresponds to 0~127 Lux; 1 corresponds to 128~255 Lux; 2 corresponds to 256383 Lux, . . . , and 511 corresponds to 6540765535 Lux). However, this is not the only way. In a preferable embodiment, for the exposure E3 of a larger dynamic range R3, the part E31 thereof which is in a range (R3-R2) higher than the next higher dynamic range R2 corresponding to the exposure E2 can be arranged to have a better resolution, that is, the converted digital codes in the code range D3 corresponding to the exposure part E31 have a better resolution (the digital codes of E3 have a smaller difference between steps in the region (R3-R2), and a larger difference between steps in the region R2 and below). Similarly, the exposure part E21 corresponding to the dynamic range (R2-R1) has a better resolution than the rest part in the exposure E2, that is, the digital codes generated from the exposure part E21 in the code range D2 have abetter resolution or a smaller difference between steps than the rest part in the exposure E2.

Figure 4:
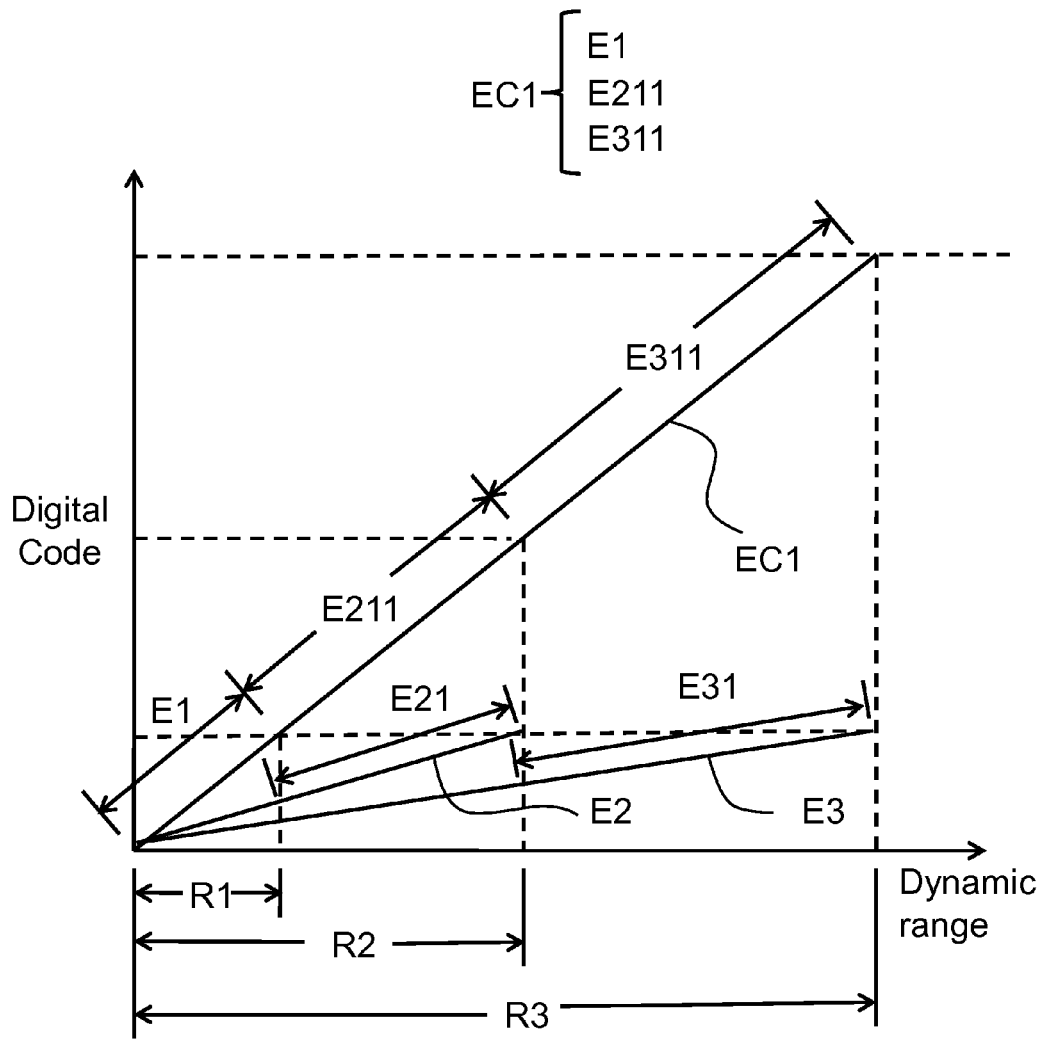
FIG. 4 shows another preferable embodiment of the relation between the exposure and the code combination according to the present invention.

The code combination is a combination of the exposures E1, E2 and E3, or their exposure parts, and weightings can be assigned to the exposures as they are combined. The combination can be designed according to the requirements in the application of the ambient light sensing device 10 (for example, the weightings can be determined according to the brightness range of the environment that the ambient light sensing device 10 usually operates in), to obtain a best effect. As an example shown in FIG. 3, a code combination EC is obtained by combining the exposure E1 and the exposure parts E21 and E31, which becomes a continuous function. The code combination EC has a code range of D1+D2+D3 and a dynamic range of R3, wherein D1 represents the digital code of the exposure E1. Another embodiment is shown in FIG. 4, wherein the digital codes in the ranges D2 and D3 of the exposure parts E21 and E31 are multiplied by respective weightings to become weighted exposure parts E211, E311, and the code combination EC1 is obtained by combining the exposure E1 and the weighted exposure parts E211 and E311, which is also a continuous function.

Figure 5:
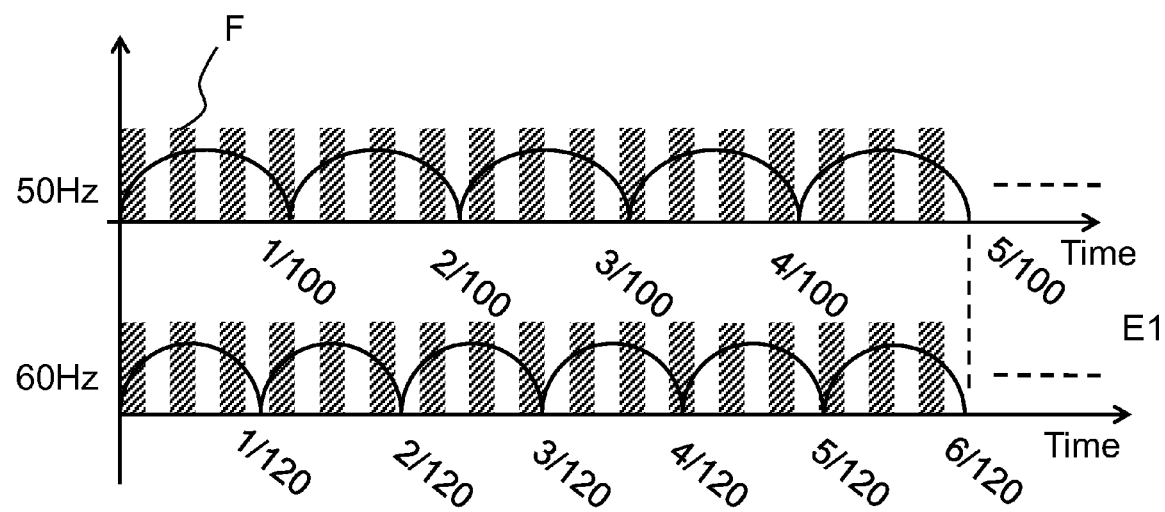
FIG. 5 shows another preferable embodiment of the relation between the sampling frame rate and the input power.

Referring to FIG. 5, a relation between the sampling frame rate and the input power is shown. The public power system supplies AC electric power in 50 Hz or 60 Hz frequency, and the AC power is rectified to a positive semi-sinusoidal wave of 100 Hz or 120 Hz. In a preferable embodiment of the present invention, the sampling frame rate of the pixel 11 is set as 600 Hz (the least common multiple of 100 Hz and 120 Hz) or a multiple of 600 Hz. Each exposure E1~E3 (E1 is shown in the figure for example) is obtained by sampling 30 times (or a multiple of 30) and averaging them. In this way, the ambient light sensing device is applicable to both 100 Hz and 120 Hz power supply systems to avoid flicker, and the sampling F can work under both 100 Hz and 120 Hz power supply systems. What is described in the above is only a preferable embodiment, and it can be modified. For example, if it is known that the public power system has a 50 Hz frequency, then the sampling frame rate can be 100 Hz instead of 600 Hz, and it is not necessary to average the sampled data.

Referring back to FIG. 1, in a preferable embodiment, the ambient light sensing device 10 can further include a shaded pixel PA. The exposure by one pixel 11 generates an exposure output (EO) and the exposure by the shaded pixel PA generates an exposure output (ED); the read out circuit 12 generates a corresponding digital code according to (EO−ED) to eliminate the background noise such as dark current. The difference by the subtraction can indicate the true result from sensing the ambient light. The readout circuit generates the digital code according to the difference (EO−ED).

In another preferable embodiment, the ambient light sensing device 10 can take exposures by two stages, wherein the first stage is to judge the dynamic range that the ambient light brightness presently falls in; after the dynamic range is determined, each sensing step in the second stage can be one exposure instead of plural exposures, by an exposure time duration corresponding to that specific dynamic range. That is, the ambient light sensing device 10 can perform plural first stage exposures and at least one second stage exposure. During the second stage exposure, if it is found that the sensed ambient light brightness is out of the dynamic specific range, the ambient light sensing device 10 can return to the first stage exposures to redefine the dynamic range that the ambient light brightness presently falls in. In another embodiment, the ambient light sensing device 10 can periodically redo the first stage exposures to check the ambient light brightness.

Figure 6:
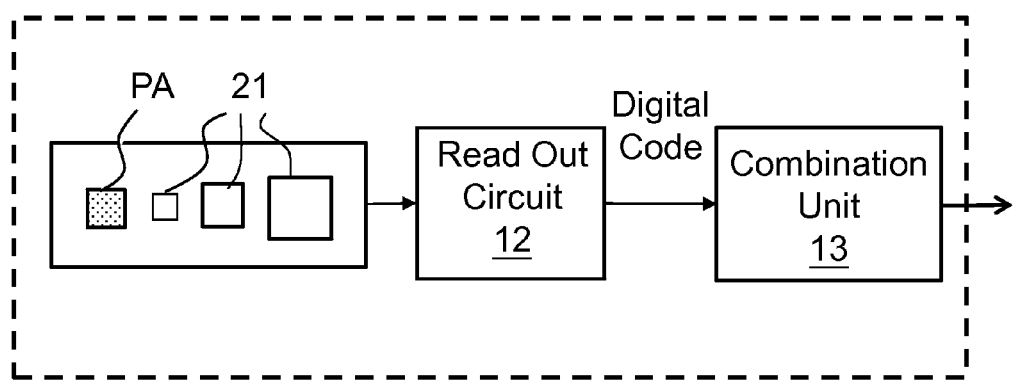
FIG. 6 shows another preferable embodiment of an ambient light sensing device according to the present invention.

FIG. 6 shows another preferable embodiment of an ambient light sensing device 20 of the present invention. The ambient light sensing device 20 includes a plurality of pixels 21, a read out circuit 12, and a combination unit 13. The plural pixels 21 have different active areas of different sizes for detecting different dynamic ranges to generate corresponding exposure values, respectively. In the first embodiment of the present invention, the pixels 11 receive multiple exposures, while in this embodiment, the pixels 21 have different active areas of different sizes; both can detect different dynamic ranges. In this embodiment, the pixels 21 can receive only one single exposure; however, it can certainly be so arranged for the pixels 21 to receive multiple exposures, that is, the first and this embodiment can be combined so that there are plural exposures and different sizes of active areas. Similar to the first embodiment, the read out circuit 12 can read the exposures to generate corresponding digital codes which indicate exposure values. The combination unit 13 combines the digital codes generated from the exposures to generate a code combination (e.g., referring to EC and EC1 in FIGS. 3 and 4).

Still referring to FIG. 6, the ambient light sensing device 20 can further include a shaded pixel PA. The exposure by each pixel 21 generates an exposure output (EO1) and the exposure by the shaded pixel PA generates an exposure output (ED1); the read out circuit 12 generates a corresponding digital code according to (EO1−ED1) to eliminate the background noise such as dark current. The difference by the subtraction can indicate the true result from sensing the ambient light. The readout circuit generates the digital code according to the difference (EO1−ED1).

Similar to the first embodiment, the ambient light sensing device 20 can take exposures by two stages, wherein the first stage is to judge the dynamic range that the ambient light brightness presently falls in; after the dynamic range is determined, each sensing step in the second stage can be an exposure on one of the pixel 21 which has the proper size of the active area, but not on the other pixels 21 to reduce unnecessary power consumption. If it is found that the sensed ambient light brightness is out of the dynamic specific range, the ambient light sensing device can return to the first stage to expose the pixels 21 with different active areas, to redefine the dynamic range that the ambient light brightness presently falls in. In another embodiment, the ambient light sensing device 20 can periodically redo the first stage exposure to check the ambient light brightness.

FIG. 7 shows another embodiment according to the present invention. In this embodiment, the ambient light sensing device 30 includes plural pixels 31a, 31b, and 31c (the number is shown to be three as an example for illustrative purpose, but the present invention is not limited to this number), a read out circuit 12, and a combination unit 13. As shown in FIG. 8, the pixels 31a, 31b, 31c can respectively be exposed by different exposure time durations T1, T2, T3 to sense different dynamic ranges to generate corresponding exposure values. The embodiment shown in FIG. 1 is to expose the same pixel by three different time durations; this embodiment is to expose different pixels by different time durations. Compared with the embodiment shown in FIG. 1, the benefit of this embodiment is that the exposure time durations T1, T2, T3 of different pixels can be overlapped with one another, so the total exposure time duration is less; however, the first embodiment has the benefit that the control mechanism is simpler.

The first embodiment and this embodiment can be combined; for example, referring to FIG. 9, three (or more) exposures of different time durations can be performed on two pixels 31a, 31b.

Furthermore, the embodiment shown in FIG. 6 also can be combined with the aforementioned embodiments shown in FIGS. 8, 9, that is, some or all of the pixels 31a, 31b and 31c can have different sizes.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. A circuit or device which does not affect the primary function of the circuit can be inserted between two circuit or devices shown to be in direct connection in the figures; for example, a sampling circuit can be inserted between the pixels and the read out circuit. An embodiment or a claim of the present invention does not need to attain or include all the objectives, advantages or features described in the above. The abstract and the title are provided for assisting searches and not to be read as limitations to the scope of the present invention.

What is claimed is:

1. An ambient light sensing device, comprising:
at least one pixel, receiving a plurality of exposures having different exposure time durations to sense different dynamic ranges, the exposures including an exposure of a first dynamic range (Rx) and an exposure of a second dynamic range (Ry), wherein Ry is larger than Rx;
a read out circuit, reading the exposures and generating corresponding digital codes; and
a combination unit, combining the digital codes to generate a code combination indicating the result of ambient light detection, wherein the code combination has a higher resolution than each of the digital codes,
wherein the code combination includes a first digital code corresponding to the exposure of a first dynamic range and a second digital code corresponding to the exposure in the difference range, and in a two-dimensional coordinate system in which the horizontal axis is the dynamic ranges and the vertical axis is the digital codes, the first digital code connects the second digital code, wherein both the first digital code and the second digital code are not multiplied by any weighting, or the first digital code is not multiplied by any weighting whereas the second digital code is multiplied by a weighting.

2. The ambient light sensing device of claim 1, wherein a part of the exposure in a difference range (Ry–Rx) in the second dynamic range has a higher resolution than the rest part of the exposure of the second dynamic range.

3. The ambient light sensing device of claim 1, wherein the plural exposures are performed by a sampling frame rate of 600 Hz or a multiple of 600 Hz.

4. The ambient light sensing device of claim 1, further including a shaded pixel, wherein an exposure received by the at least one pixel generates an exposure output (EO) and an exposure received by the shaded pixel PA generates an exposure output (ED), and wherein the read out circuit generates the corresponding digital code according to a difference (EO–ED).

5. The ambient light sensing device of claim 1, wherein the plurality of exposures include a plurality of first stage exposures and at least one second stage exposure, the first stage exposures determining the dynamic range that ambient light brightness presently falls in, and the pixel receiving the second stage exposure according to the determined dynamic range.

6. An ambient light sensing device, comprising:
a plurality of pixels, respectively receiving at least one exposure to sense different dynamic ranges;
a read out circuit, reading the exposures and generates corresponding digital codes, the exposures including an exposure of a first dynamic range (Rx) and an exposure of a second dynamic range (Ry), wherein Ry is larger than Rx, and a part of the exposure in a difference range (Ry–Rx) in the second dynamic range has a higher resolution than the rest part of the exposure of the second dynamic range; and
a combination unit, combining the digital codes and generating an code combination indicating the result of ambient light detection, wherein the code combination has a higher resolution than each of the digital codes,
wherein the code combination includes a first digital code corresponding to the exposure of a first dynamic range and a second digital code corresponding to the exposure in the difference range, and in a two-dimensional coordinate system in which the horizontal axis is the dynamic ranges and the vertical axis is the digital codes, the first digital code connects the second digital code,
wherein both the first digital code and the second digital code are not multiplied by any weighting, or the first digital code is not multiplied by any weighting whereas the second digital code is multiplied by a weighting.

7. The ambient light sensing device of claim 6, wherein the plurality of pixels have different active areas of different sizes, respectively.

8. The ambient light sensing device of claim 6, wherein the plurality of pixels receive exposures of different exposure time durations, respectively.

9. The ambient light sensing device of claim 6, wherein a part of the exposure in a difference range (Ry–Rx) in the second dynamic range has a higher resolution than the rest part of the exposure of the second dynamic range.

10. The ambient light sensing device of claim 6, wherein the exposure is performed by a sampling frame rate of 600 Hz or a multiple of 600 Hz.

11. The ambient light sensing device of claim 6, further including a shaded pixel, wherein an exposure received by the at least one pixel generates an exposure output (EO) and an exposure received by the shaded pixel PA generates an exposure output (ED), and wherein the read out circuit generates the corresponding digital code according to a difference (EO–ED).

12. The ambient light sensing device of claim 6, wherein the plurality of pixels receive plural exposures including a plurality of first stage exposures and at least one second stage exposure, the first stage exposures determining the dynamic range that ambient light brightness presently falls in, and the pixel receiving the second stage exposure according to the determined dynamic range.

13. An ambient light sensing method, comprising:
obtaining a plurality of relatively lower resolution exposure values respectively corresponding to different dynamic ranges, the lower resolution exposure values including an exposure value corresponding to a first dynamic range (Rx) and an exposure value corresponding to a second dynamic range (Ry), wherein Ry is larger than Rx, and a part of the exposure in a difference range (Ry–Rx) in the second dynamic range has a higher resolution than the rest part of the exposure of the second dynamic range; and
combining the plurality of lower resolution exposure values to generate a code combination having a relatively higher resolution to indicate the ambient light sensing result,
wherein the code combination includes a first digital code corresponding to the exposure of a first dynamic range and a second digital code corresponding to the exposure in the difference range, and in a two-dimensional coordinate system in which the horizontal axis is the dynamic ranges and the vertical axis is the digital codes, the first digital code connects the second digital code,
wherein both the first digital code and the second digital code are not multiplied by any weighting, or the first digital code is not multiplied by any weighting whereas the second digital code is multiplied by a weighting.

14. The ambient light sensing method of claim 13, wherein the plurality of relatively lower resolution exposure values are obtained by a plurality of exposures.

15. The ambient light sensing method of claim 13, wherein the plurality of relatively lower resolution exposure values are obtained by exposing a plurality of pixels respectively having different active areas of different sizes.

16. The ambient light sensing method of claim 13, wherein the plurality of relatively lower resolution exposure values are obtained by exposing a plurality of pixels by different time durations.

17. The ambient light sensing method of claim 13, wherein each exposure is obtained by an average of sampled data of 30 sampling times or a multiple of 30 sampling times by a sampling frame rate of 600 Hz or a multiple of 600 Hz.

18. The ambient light sensing method of claim 13, further comprising:
sensing ambient light to determine a dynamic range corresponding to the ambient light brightness in a first stage; and
sensing the ambient light only in the determined dynamic range by the relatively lower resolution in a second stage.

* * * * *